United States Patent [19]
Iwasaki

[11] Patent Number: 5,749,001
[45] Date of Patent: May 5, 1998

[54] CAMERA PHOTOMETRY DEVICE

[75] Inventor: Hiroyuki Iwasaki, Yokohama, Japan

[73] Assignee: Nikon Corporation, Tokyo, Japan

[21] Appl. No.: 755,012

[22] Filed: Nov. 22, 1996

[30] Foreign Application Priority Data

Feb. 15, 1996 [JP] Japan .................... 8-027485

[51] Int. Cl.[6] .................................. G03B 7/08
[52] U.S. Cl. ................... 396/150; 396/234; 396/271
[58] Field of Search ....................... 396/150, 234, 396/233, 271, 272, 268, 373

[56] References Cited

U.S. PATENT DOCUMENTS

3,498,198  3/1970  Fujii ........................ 396/271
4,739,360  4/1988  Ohmura et al. ............... 396/233
4,779,116  10/1988  Vogt ......................... 396/234
4,958,185  9/1990  Kamiya et al. ............... 396/271
5,534,968  7/1996  Takagi ...................... 396/233
5,602,615  2/1997  Muramatsu et al. ............ 396/234

*Primary Examiner*—W. B. Perkey
*Attorney, Agent, or Firm*—Oliff & Berridge

[57] ABSTRACT

In a case in which the photometry region selected through a photometry region selection part is in the center of the screen, body spot photometry is selected for photometry of the object field, using luminous flux not passing through the screen. In all other cases, an output is selected for photometry of the image of the object field formed on the screen.

26 Claims, 9 Drawing Sheets

PRIOR ART

CAMERA PHOTOMETRY DEVICE

BACKGROUND OF THE INVENTION

1. Field of the Invention

This invention relates to a camera photometry device which is capable of selecting a plurality of photometry regions.

2. Description of Related Art

Figure 9:
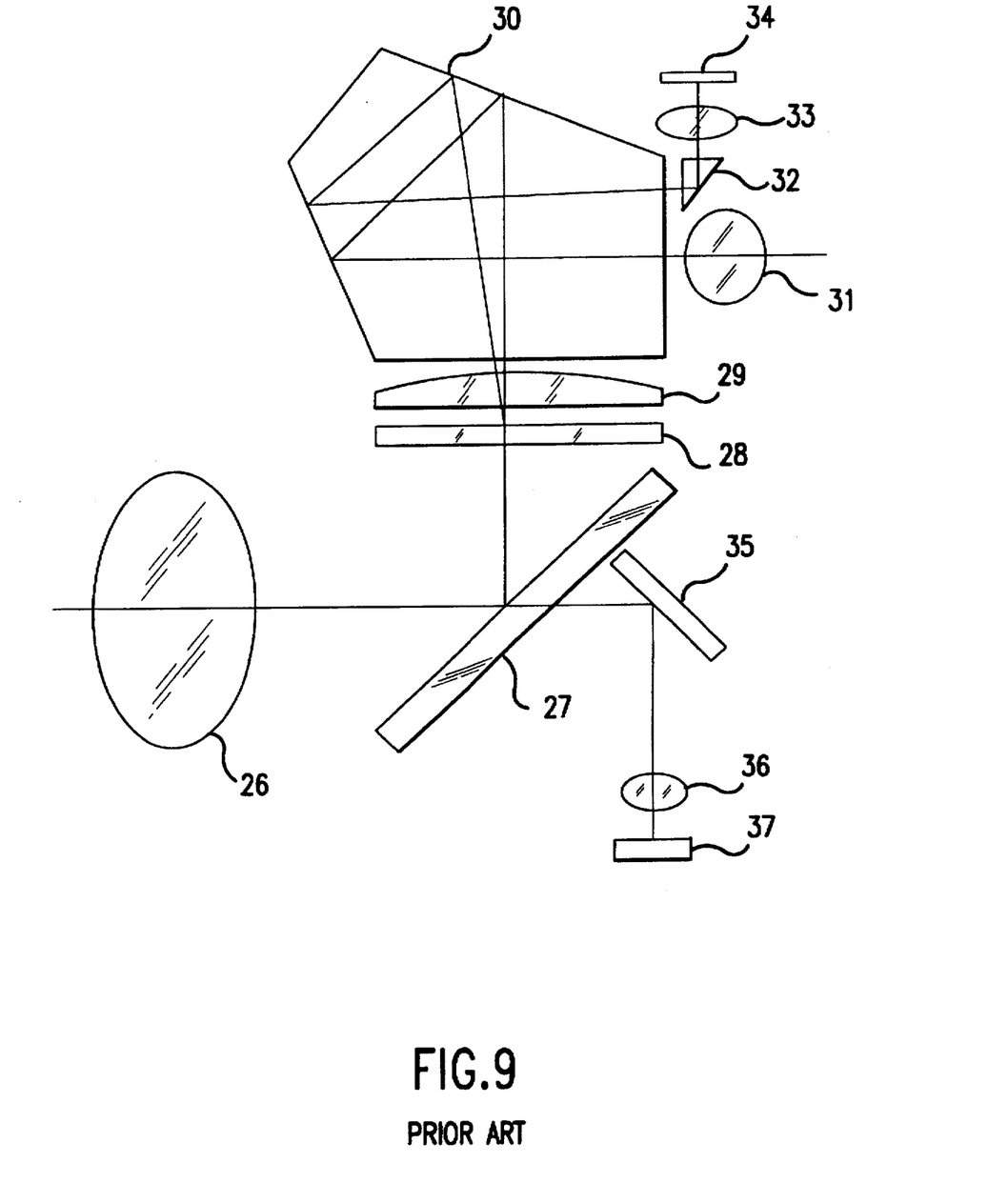
FIG. 9 is an explanatory figure denoting conventional technology.

FIG. 9 is a figure denoting an example of a conventional camera photometry device.

Conventionally, in these types of camera photometry devices, there are screen photometry methods and body photometry methods. Moreover, the utilization of a plurality of photometry regions is also commonly known.

In the screen photometry method, light from the object field is formed on screen 28. Then, a part of the luminous flux diffused by the screen 28 is re-formed in a photoreceptor element 34 by a photometry lens 33. The photoreceptor element 34 is divided into a plurality of photometry regions, and the output of each of these regions is read out, respectively, to execute the photometry on the plurality of regions.

On the other hand, in the body photometry method, luminous flux that has passed through a semi-permeable main mirror 27 is reflected by a submirror 35, to be guided to the photoreceptor element 37. Then photometry is performed using the luminous flux that does not pass through the screen 28.

However, in the above-explained conventional photometry devices, a problem exists in that, when the screen photometry method is employed, in a case in which screen 28 is a screen to which a split-prism screen is attached, or in the case of the so-called permeable (transparent) screen which does not cause diffusion, these devices are incapable of photometry on regions not having a diffusion characteristic.

Moreover, when the body photometry method is used, since space is limited, there were problems in that it is difficult to equip the device with a plurality of photometry regions, or that limitations exist in the photometry regions provided.

SUMMARY OF THE INVENTION

An object of this invention is to present a camera photometry device capable of selecting a plurality of photometry regions without losing the advantages of the screen photometry method, even in a case in which a screen is utilized that does not have a diffusion characteristic.

In order to solve the aforesaid problems, in a first embodiment, the invention provides a camera photometry device equipped with an optical system capable of image formation of the luminous flux from an object field onto a screen through the photographic lens. The invention is capable of observation of that object field and is equipped with a plurality of photometry regions for photometry of the object field. The camera photometry device further includes: a first photometry part for photometry of the image of the object field formed on the screen, through a photometry region positionally arranged at least in the center of the screen, as well as outside the screen center, from among photometry regions equal to or smaller than a focusing visual observation part of that screen, a second photometry part for photometry of the object field, using the luminous flux that does not pass through said screen, a region selection part capable of selecting said photometry regions in at least the screen center part and outside of the screen center part, and an output selection part for selecting the output of the second photometry part, in a case where the photometry region selected through the region selection part is in the screen center part, and for selecting the output of said first photometry part in all other cases, e.g., in cases where the photometry region is outside of the screen center part.

The invention also provides an interchangeable screen.

In order to further achieve the above objectives in the invention, a camera photometry device is equipped with an optical system capable of image formation of luminous flux from an object field, through the photographic lens, and onto an interchangeable screen, and is capable of observation of that object field. Furthermore, the camera is equipped with a plurality of photometry regions for photometry of the object field. The camera photometry device is further comprised of: a first photometry part for photometry of the image of the object field formed on said screen, a second photometry part for photometry of the object field, using luminous flux that does not pass through the screen, a region selection part for selecting the photometry regions, a screen determination part for determining types of the screens, and an output selection part for selecting the output of second photometry part or the first photometry part, based on the output of the screen determination part.

Moreover, to achieve the above objective, the invention also provides that the output selection part selects the output of the second photometry part in a case when the region of the component not having a matte surface, on the installed screen, has been selected as the photometry region, and selects the output of the first photometry part in all other cases. Furthermore, the output selection part selects the output of said second photometry part in a case in which, at the time a screen equipped with a focusing visual observation part is installed, the region having that focusing visual observation part is selected as the photometry region, and selects the output of the first photometry part in all other cases.

Additionally, the output selection part selects the output of the second photometry part in a case in which the installed screen is completely transparent, and selects the output of the first photometry part in all other cases.

Lastly, the output selection part prohibits the selection of photometry regions in cases in which the installed screen is completely transparent.

To further achieve the above objectives in the invention, the second photometry part performs photometry using the output of the focus detection part. Also, in the invention, because the output of the second photometry part is selected in the case in which the selected photometry part is in the screen center, and because the output of the first photometry part is selected in all other cases, even if the focus visual observation part does not have a diffusion from a split prism and the like at the center of the screen, photometry is possible with the plurality of regions included at the screen center.

Moreover, to achieve the objectives of the invention, since the screen has interchangeable capability, photometry of the screen center is possible, and meanwhile, various screens can be interchanged.

Furthermore, since the output of either the second photometry part or the first photometry part is selected based on the output of the screen determination part, the screen is interchangeable, and the photometry of a plurality of regions is possible.

To further achieve the above objectives, in a case in which the focusing visual observation part of the installed screen (component of the region not having a matte surface) is selected as the photometry region, the output of the second photometry part is selected; in all other cases, the output of the first photometry part is selected. As a result, photometry is possible of the plurality of regions that include a screen focusing visual observation part.

To further achieve the objectives of the invention, in a case when the focusing visual observation part (in regions having a split prism, etc.) is selected as the photometry region, the output of the second photometry part is selected. In all other cases, the output of the first photometry part is selected, with the result that photometry is possible with the plurality of regions that include a focusing visual observation part.

Furthermore, in a case in which the installed screen is completely transparent, the output of the second photometry part is selected. In all other cases, the output of the first photometry part is selected, with the result that, even in a case in which a completely transparent screen is installed, photometry of a plurality of regions is possible.

Even further, in a case in which the installed screen is completely transparent, selection of photometry regions is prevented, with the result that it is possible to prevent errors in photometry in cases in which completely transparent screens have been installed.

Also to achieve the objectives of the invention, the second photometry part performs photometry using the output of the focus detector (detection part), with the result that photometry can be performed on surfaces other than matte surfaces without adding special photometry parts.

In accordance with this invention as explained above in detail, even when regions incapable of photometry exist by reason of the screen characteristics, the output of the second photometry part may be used, with the result that the number of regions incapable of photometry can be rendered extremely small.

In particular, according to the first embodiment of the invention, even in cases in which the focusing visual observation part is at the center of the screen (in regions not possessing split prism diffusion, as well as other kinds of diffusion), it is still possible to perform photometry of several other regions that are included in the center.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

The preferred embodiments of this invention are explained below in accordance with the figures.

1. First Embodiment

Figure 1:
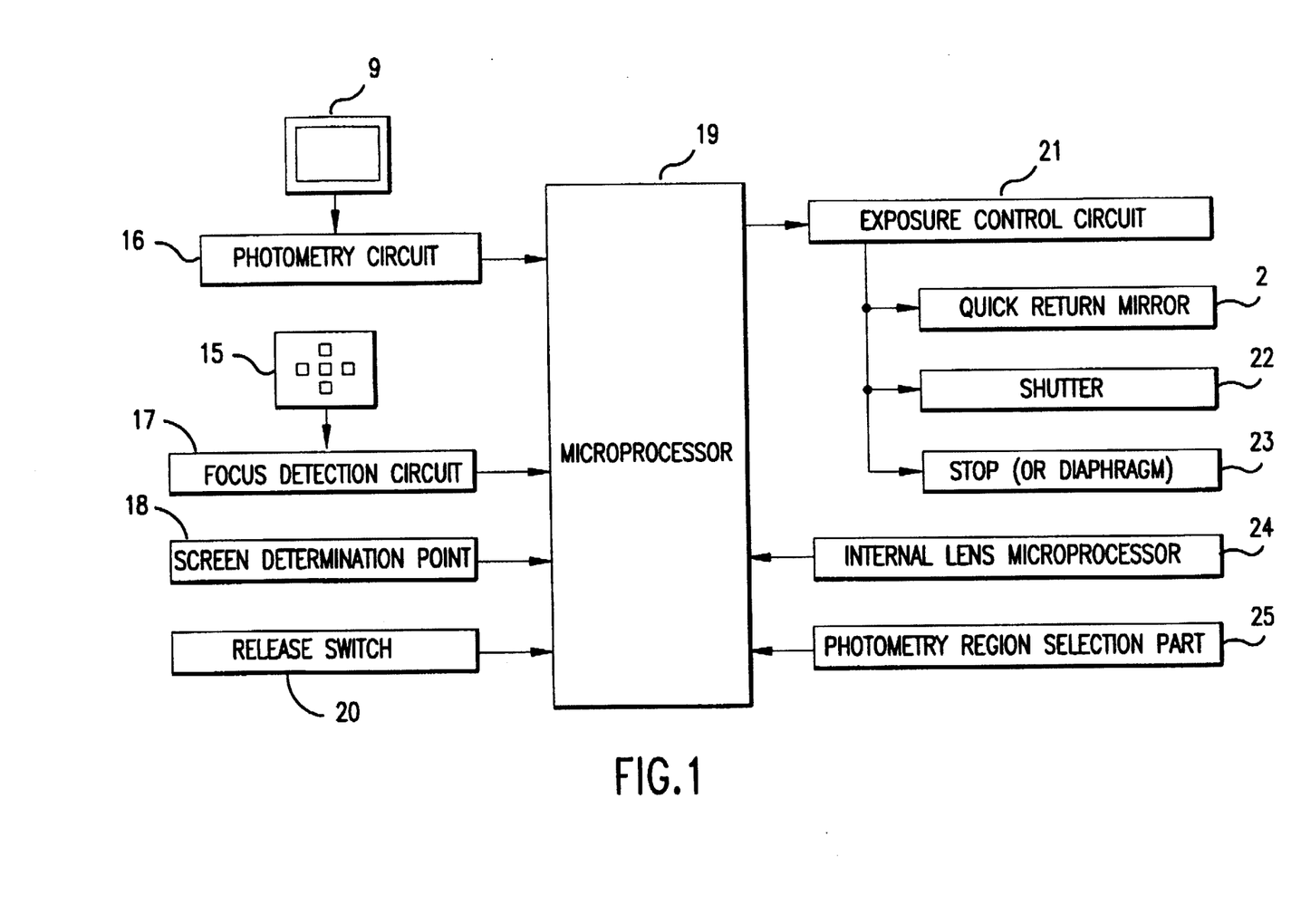
FIG. 1 is a block diagram denoting the first preferred embodiment of a photometry device in a camera of the invention.

FIG. 1 is a block diagram denoting an outline of the composition of a camera photometry device relating to the first embodiment of this invention.

This photometry device is controlled centrally through microprocessor 19. A photoreceptor element(s) 9 is constructed using an accumulation-type sensor, such as a CCD, as denoted in FIG. 3. The measurement of light is performed by dividing almost the entire plane of the object field into 240 regions (20 regions times 12 regions). The photometry value is output to the microprocessor 19 through a photometry circuit 16.

Figure 5:
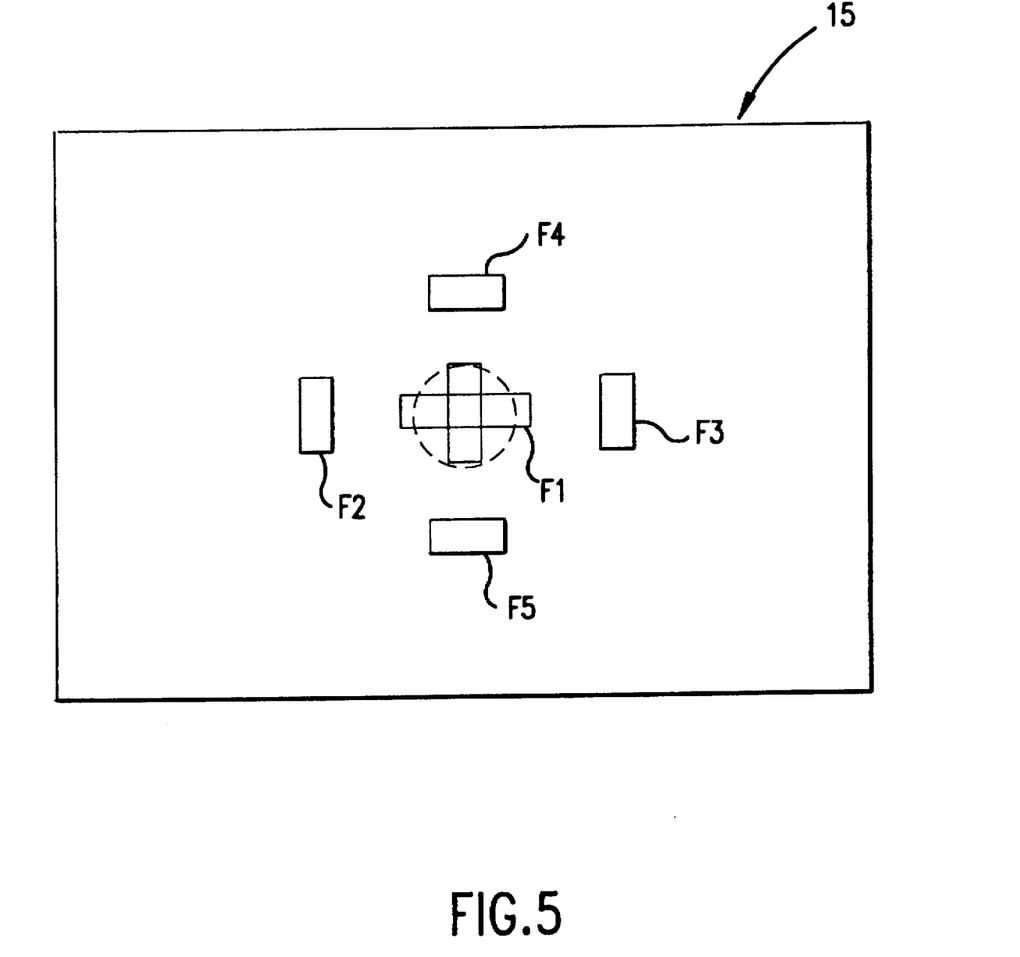
FIG. 5 is a figure denoting the focus detection regions of the focus detection means of the first embodiment.

A focus detection element 15, as denoted in FIG. 5, is an element for performing focus detection on five regions F1 through F5 of the object field. Focus detection data is output to the microprocessor 19 through the focus detection circuit 17. A screen determination part 18 determines the type of a screen installed in the camera, and outputs the data to the microprocessor 19. The screen types and the determination method therefor will be explained later in detail.

Figure 3:
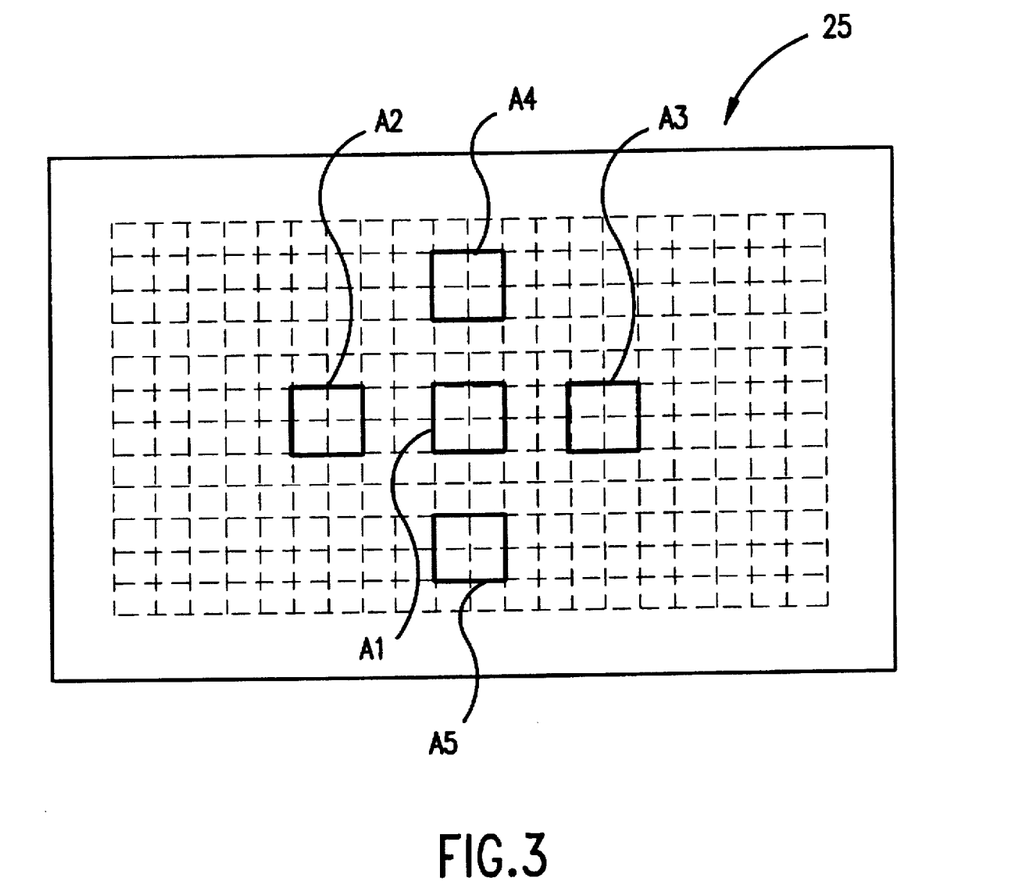
FIG. 3 is a figure denoting the state in which the photometry means of the first preferred embodiment has a visible grid.

Photometry region selection part 25, as denoted in FIG. 3, outputs data to the microprocessor 19, showing which region is being selected from each of the spot photometry regions A1–A5.

An internal lens microprocessor 24 is a microprocessor established within a photographic lens barrel not shown in the figures, which outputs to the microprocessor 19 data, such as the open diaphragm value of the photographic lens used for the correction of the photometry value, the irradiation lens position, and the focal length.

The release switch 20 is a two-level switch. When the switch is half-depressed, a main power switch, not shown in the figure, is turned on and the program of the microprocessor 19 is started. Then, exposure to the film is begun by full depression of the switch. The program of microprocessor 19 is explained later in detail.

The exposure control circuit 21 performs control of a quick-return mirror 2, a shutter 22, or a stop 23, at the time the full depression signal of the release switch 20 is received to perform exposure.

Figure 2:
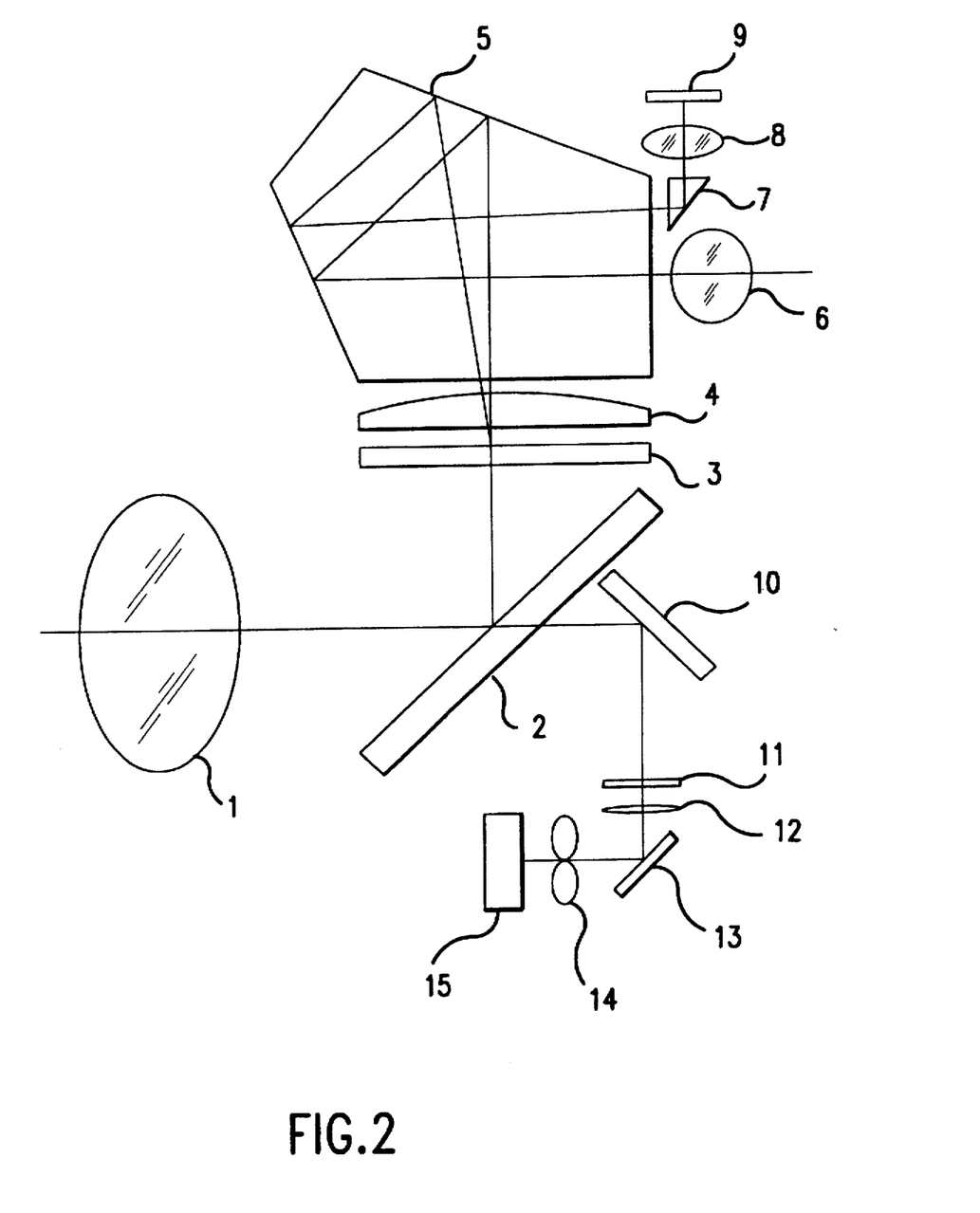
FIG. 2 is a figure denoting an optical system of the first preferred embodiment.

FIG. 2 is a figure denoting an optical system of the camera photometry device relating to this preferred embodiment.

The luminous flux passing through photographic lens 1 passes through quick-return mirror 2, and reaches the eye of the photographer through a diffusion screen 3, a condenser lens 4, a pentaprism (pentagonal prism) 5, and an eyepiece lens 6.

On the other hand, one portion of luminous flux diffused through diffusion screen 3 passes through the condenser lens 4, the pentaprism 5, the photometry prism 7, the photometry lens 8, and then arrives at receptor element 9.

Moreover, the quick return mirror 2 is a semi-transparent type, and luminous flux that passes through is then reflected by the submirror 10, and passes through a focus detection optical mask 11, a field lens 12, a mirror 13, and a separator lens 14, and then enters the focus detection element 15.

Figure 4:
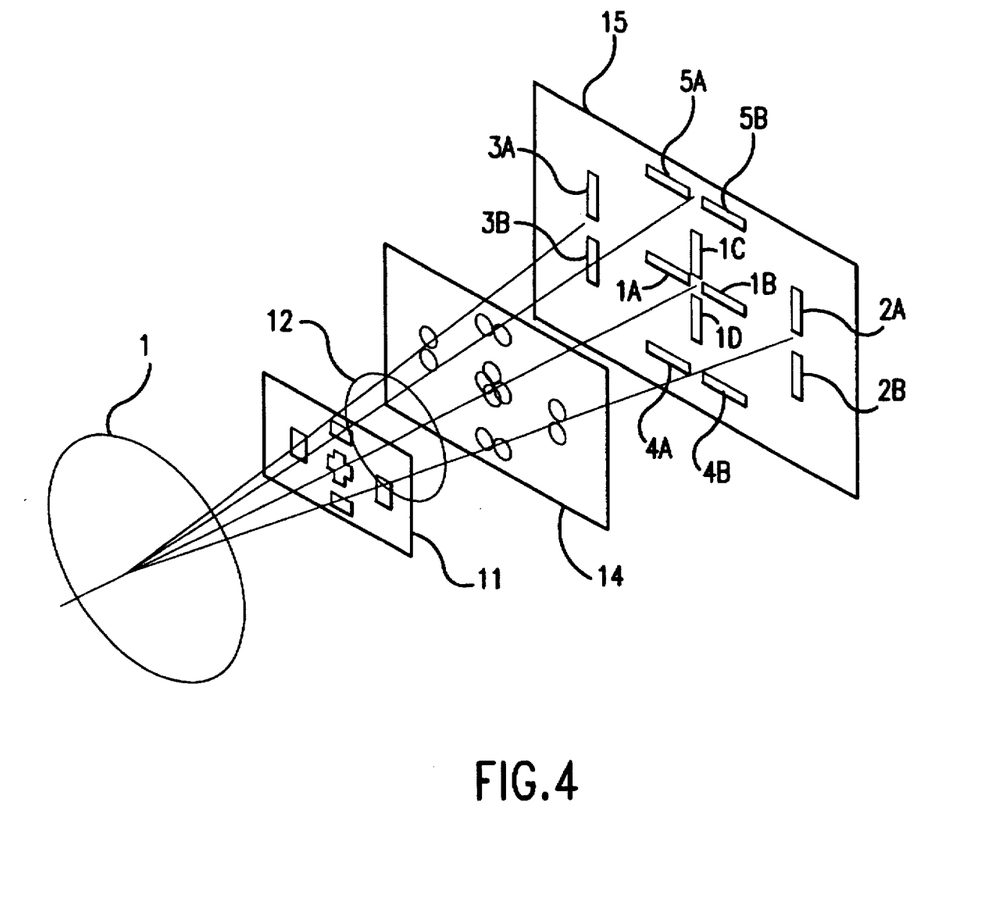
FIG. 4 is a figure explaining the optical system of the focus detection means of the first preferred embodiment.

FIG. 4 is an oblique figure denoting the details of the focus detection device in the camera photometry device relating to the present embodiment.

The luminous flux passing through the photographic lens 1 is stepped down of all but necessary luminous flux by mask 11, which is then concentrated by the field lens 12. Then, through the separator lens 14, an image is formed in each of the photoreceptor regions of the focus detection element 15. The so-called phase contrast detection method is used as the method of focus detection, in which a second image of the object field which has formed is received by a pair of CCD sensors respective to each region established in focus detection element 15 through a pair of separator lenses established in each focus detection region, to detect the focus state through the amount of displacement in the output of those sensors.

Moreover, the region F1 (See FIG. 5) in the screen center is a cross-type region, in which CCD sensors 1A and 1B which detect the amount of displacement in the horizontal direction, and CCD sensors 1C and 1D which detect the amount of displacement in the vertical direction, are provided (see FIG. 4).

As described above, these optical systems are usually established for focus detection. However, this structure is also commonly used in photometry devices for the purpose of determining the brightness distribution of the object field. As a result, it is possible to use their output in the photometry device for photometry purposes. If the output of the focus detection element 15 is defined as V, the accumulation time as t, and the revised value as Z, the brightness value BV at the accumulation time will be produced by Formula (1) below.

$$BV = \log(V/t)/\log 2 + Z \tag{1}$$

From this, the value Z is mainly a revised coefficient for revising the difference between the open diaphragm value of the installed photographic lens, and the F number of the luminous flux utilized in the focus detection optical systems.

Figure 6A:
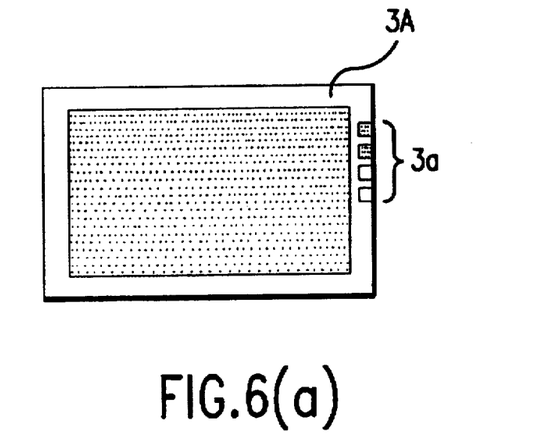
FIGS. 6(a)–(c) are explanatory figures of the first interchangeable screen.
Figure 6B:
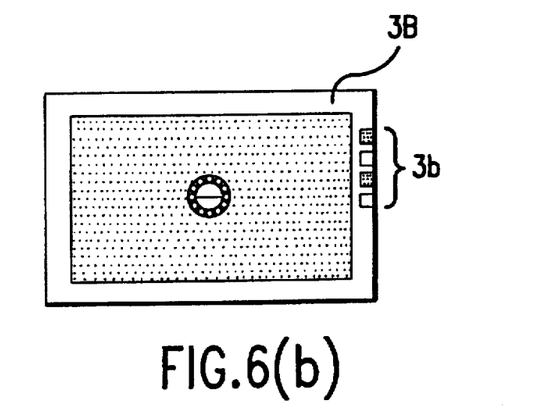
Figure 6C:
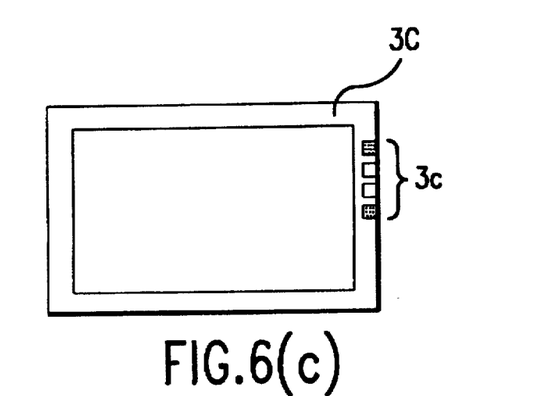

FIG. 6 is an explanatory diagram denoting the interchangeable screens applied in the camera of the invention.

FIG. 6(a) shows a full-surface mat screen 3A, used as a standard screen, in which the entire surface of the screen has been made of a diffused mat surface.

FIG. 6(b) is a split microprism type of screen 3B, with a split prism established in a roughly 2 mm section of the screen center. Moreover, the microprisms are established along the periphery, and the photographer can easily adjust the focus manually. In the case of this screen 3B, the luminous flux passing through the split and microprism sections (focusing visual observation part(s)) has a different diffusion characteristic than that possessed by the perimeter mat surface. Because of this, in a case when the screen photometry method performs photometry using one section of diffused light, when the photometry regions have duplicated split microprism sections, the effect of luminous flux eclipse, and the like, are perceived and photometry errors occur. Moreover, this occurs in the same way when split sections or microprism sections are used by themselves.

FIG. 6(c) is a screen 3C having a completely transparent surface in which, when it is equipped with a dark lens or the like, the finder can easily be seen clearly. When this screen 3C is used (the same as in the screens above), luminous flux that passes through this screen is not diffused, which causes photometry errors.

Moreover, in the frame of each screen 3A, 3B, and 3C, contact points 3a, 3b, and 3c are established for screen determination. By determining the conduction of these contact points on the camera body side, it is possible to determine which screen has been installed.

Figure 7:
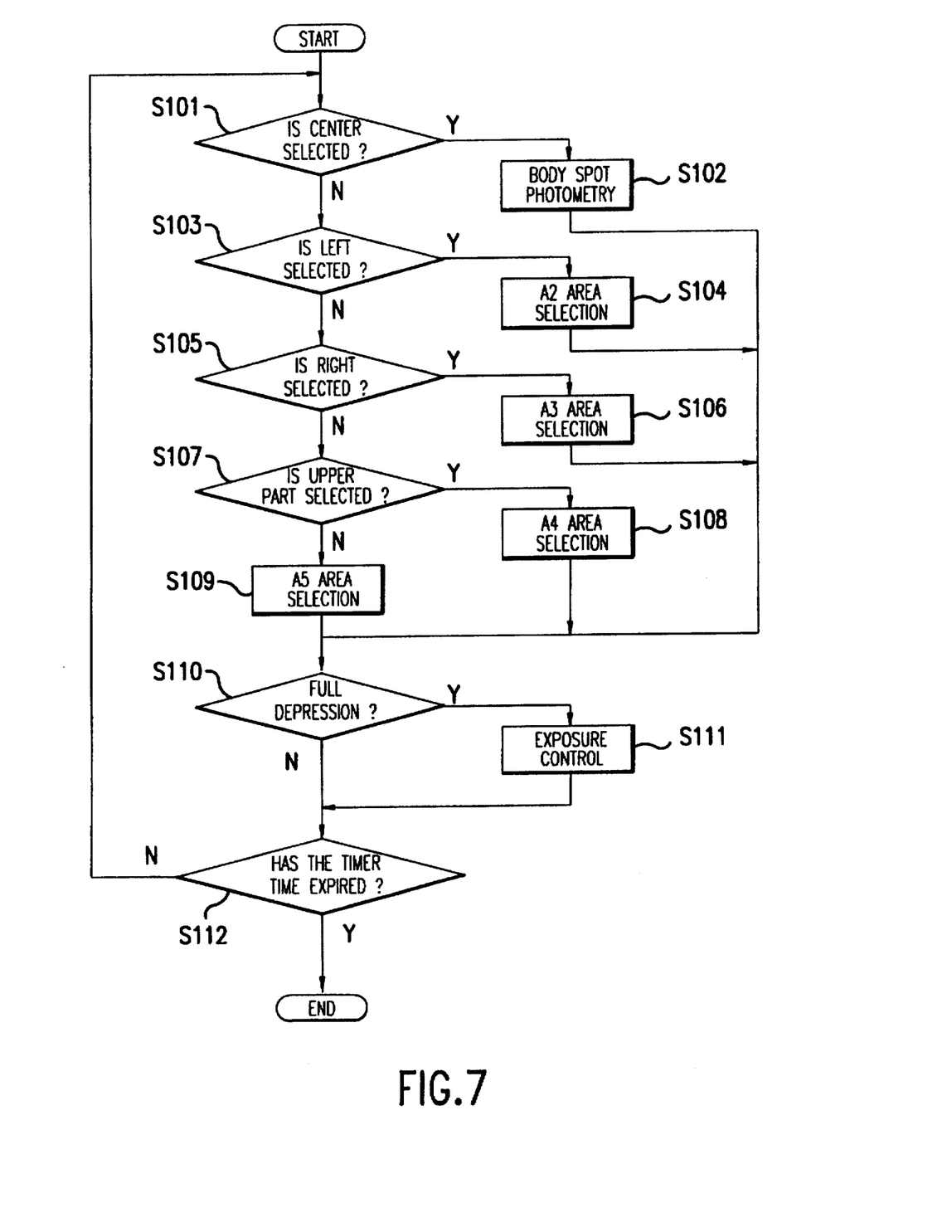
FIG. 7 is a flowchart denoting an algorithm of the first preferred embodiment.

FIG. 7 is an algorithm flow chart for microprocessor 19 of the camera photometry device, relating to the first embodiment.

This program is executed through the release switch 20 being half-depressed. First, in step S101, it is determined whether the center A1 has been selected as the spot photometry region(s).

In the case in which the center has been selected, the program proceeds to step S102, and a body spot photometry is performed. In the case of center spot photometry, the finder screen has split microprism capability. As a result, the brightness value of the A1 region is calculated, through the output from focus detection element(s) 15 on the body side, without any eclipse effect.

As denoted in FIG. 5, the split microprism position, denoted as a dotted line, overlaps with the photometry region A1. As a result, when a split microprism type of screen has been installed, an output from the photoreceptor element 9 can not be used. As a result of the focus detection region F1 and the photometry region A1 being overlapping regions, the brightness value of the center can be calculated using the output of CCD sensors 1A–1D of focus detection element 15.

In this case, even if the complete output from CCD sensors 1A–1D is not used, any one of the CCD outputs may be used. Further, if both internal ends of the output of one of the CCDs is cut, it is also possible to increase the consistency with the center region A1.

In a case in which the photometry region selected is not in the center, the determination is made through step S103 as to whether the photometry region is on the left side. In a case in which it is on the left side, the program proceeds to step S104, and a spot photometry is performed on the region A2, using the output of the photoreceptor element 9 on the finder side.

In a case in which step S103 yielded a negative determination (that is, NO), it is determined through step S105 whether the right side was selected. In a case in which the right side was selected, the program proceeds to step A106, and spot photometry is performed on the region A3, using the output photoreceptor element 9 on the finder side.

When step S105 yields a negative determination (NO), it is determined through step S107 whether the top side has been selected. In a case in which the top side has been selected, the spot photometry is performed, in accordance with step S108, on the region A4, using the output of the photoreceptor element 9 on the finder side.

In a case in which step S107 yields a negative determination (NO), spot photometry is performed in accordance with step S109 on the region A5, using the output of photoreceptor element 9 on the finder side.

Next, in step S110, it is determined whether the release switch 20 is fully depressed. In a case in which it is fully depressed, the program proceeds to step S111, and control of the exposure is performed based on the brightness value of the selected photometry region.

In step S112, it is determined whether the half depression timer established within microprocessor 19 has been timed out (counted up). In a case in which the timer has not been timed out, the program returns to step S101, and repeats the process in the same way. In the case in which the timer has been timed out (the time set in the timer has counted down), the program is terminated.

2. Second Preferred Embodiment

Figure 8:
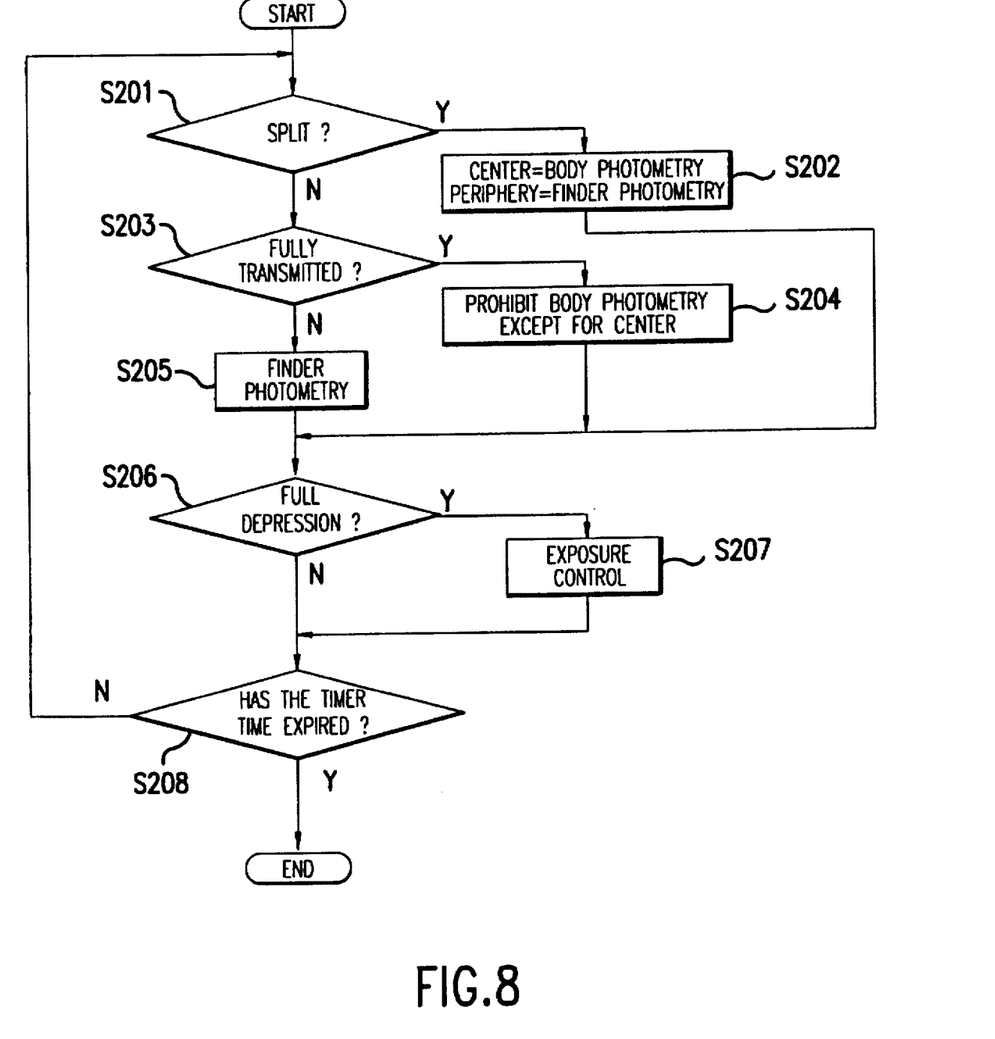
FIG. 8 is a flowchart denoting an algorithm of the second preferred embodiment.

FIG. 8 is a flow chart denoting the operation (the algorithm of microprocessor 19) of a camera photometry device relating to the second preferred embodiment. As the hardware construction is the same as in the first preferred embodiment, duplicative figures and explanation are omitted.

The base program of this embodiment is executed through the half depression of release switch 20. First, in step S201, it is determined whether the finder screen, determined and installed through screen determination part 18, is a split microprism screen 3B. In a case in which it is a split microprism screen 3B, the program proceeds to step S202, which is designed so that, in region A1, spot photometry is performed on the body side through focus detection element 15, and, in regions A2–A5, finder spot photometry is performed through photoreceptor element 9.

Alternatively, in step S203, it is determined whether the screen is a completely transparent type of screen. In a case in which it has been determined to be a completely transparent type of screen 3C, a mode is established that performs spot photometry on the body side, through focus detection element 15 (a setting is made so that a spot photometry is performed on the body side by the focus detection element 15). After this, selection of the photometry region is limited only to region A1, and establishment of the mode that performs spot photometry is prohibited in regions A2–A5.

Moreover, since a fully transparent type of screen 3C was selected, the photoreceptor element 9 is not in a state capable of photometry. As a result, a selection of photometry regions other than the center is prohibited. However, through using the output of focus detection elements 15, of focus detection regions outside the center, spot photometry may be performed on regions A2–A5. In this case, the scope of the CCD used may be adjusted in order to obtain matching between regions A2–A5 and regions F2–F5 (see FIG. 5).

If step S203 yields a negative result (that is, NO), the screen is determined to be a standard completely mat surface type of screen 3A, and the program proceeds to step S205, and the mode established is that of spot photometry that uses the output of the photoreceptor elements 9 corresponding to all of the regions A1–A5.

The explanation of steps S206–S208 is omitted, as they proceed in the same way as in the first embodiment, in accordance with FIG. 7. Though not recorded in the flow chart, the determination section of the selected photometry region is the same as in FIG. 7, thus its explanation is omitted here.

3. Other Preferred Embodiment(s)

This invention is not limited to the preferred embodiments explained above. There are various alterations in form, and changes in general, that are possible, and these are included in the scope of the invention as equal in status to the other previously explained embodiments of the invention.

In the preferred embodiments, three types of screens, of the various types of interchangeable screens, were utilized. However, there is no impediment to the use of more than three screens. In this case, whichever region becomes the region that is incapable of photometry at the photoreceptor elements 9 because of the installed screen, in the case in which the particular region is able to be determined in advance, photometry of that region may be performed using the output of focus detection element 15.

Moreover, even if it is impossible to determine in advance that the region is incapable of photometry, as equivalent to installing the screen in the memory, the fact that it is a photometry-incapable screen can be stored in advance, so that data may be read out and processed in the camera body side.

Furthermore, within and among photometry regions A1–A5, in regions that have become incapable of photometry by reason of the screen that was installed, in a case in which corresponding focus detection regions do not exist, the mode is established in which it is impossible to select that region. This also results in the ability to prevent operational error.

The above preferred embodiment(s) have a corresponding relation to the claims of the invention. For example, the photoreceptor elements 9 and the photometry circuits 16 correspond to the first photometry part, respectively, and the focus detection elements 15 and the focus detection circuits 17 to the second photometry part. The photometry region selection part 25 corresponds to the region selection part, the screen determination part 18 to the screen determination part (of these other embodiments), and, the flowcharts of FIG. 7 and FIG. 8 correspond to the output selection part, respectively.

What is claimed is:

1. A camera photometry device equipped with an optical system in which the luminous flux from the object field is formed on a screen through a photographic lens, the optical system being capable of observing the object field, and a plurality of photometry regions for performing the photometry in the object field, the camera photometry device comprising:

a first photometry part for photometry of the image of the object field formed on said screen through photometry regions positionally arranged at least at the screen center as well as outside the screen center, said photometry regions being of a size equal to or smaller than a focusing visual observation part of that screen;

a second photometry part for photometry of the object field using the luminous flux that does not pass through said screen;

a region selection part capable of selecting said photometry regions in at least the screen center and outside of the screen center; and an output selection part for selecting the output of said second photometry part in a case where the photometry region selected through said region selection part is in the screen center, and for selecting the output of said first photometry part in other cases where the photometry region is outside of the screen center.

2. The camera photometry device according to claim 1, wherein said second photometry part performs photometry using the output of the focus detection part.

3. The camera photometry device according to claim 1, wherein said screen is interchangeable.

4. The camera photometry device according to claim 3, wherein said second photometry part performs photometry using the output of the focus detection part.

5. A camera photometry device equipped with an optical system capable of image formation of the luminous flux from an object field onto an interchangeable screen through the photographic lens, and capable of observation of the object field, and a plurality of photometry regions for photometry of the object field, the camera photometry device comprising:

a first photometry part which performs photometry of the image of the object field formed on said screen;

a second photometry part which performs photometry of the object field by using luminous flux that does not pass through said screen;

a region selection part which selects said photometry regions;

a screen determination part which determines the type of said screen; and an output selection part which selects the output of either said second photometry part or said first photometry part, based on the output of said screen determination part.

6. The camera photometry device according to claim 5, wherein said second photometry part performs photometry using the output of a focus detection part.

7. The camera photometry device according to claim 5, wherein said output selection part selects the output of the second photometry part in a case when the region of a component part which is not a mat surface on the installed screen has been selected as the photometry region, and selects the output of said first photometry part in all other cases.

8. The camera photometry device according to claim 7, wherein said second photometry part performs photometry using the output of a focus detection part.

9. The camera photometry device according to claim 5, wherein said output selection part selects the output of said second photometry part in a case when a screen equipped with a focusing visual observation part is installed, and in which the region having the focusing visual observation part is selected as the photometry region, and selects the output of said first photometry part in all other cases.

10. The camera photometry device according to claim 9, wherein said second photometry part performs photometry using the output of the focus detection part.

11. The camera photometry device according to claim 5, wherein said output selection part selects the output of said second photometry part in a case in which the installed screen is completely transparent, and selects the output of said first photometry part in all other cases.

12. The camera photometry device according to claim 11, wherein said second photometry part performs photometry using the output of a focus detection part.

13. The camera photometry device according to claim 5, wherein said output selection part prohibits the selection of photometry regions in cases in which the installed screen is completely transparent.

14. The camera photometry device according to claim 13, wherein said second photometry part performs photometry using the output of a focus detection part.

15. A method of photometry for a camera photometry device equipped with an optical system in which the luminous flux from the object field is formed on a screen through a photographic lens, the optical system being capable of observing the object field, and a plurality of photometry regions for performing the photometry in the object field, the method comprising the steps of:

performing a first photometry of the image of the object field formed on said screen through photometry regions positionally arranged at least at the screen center as well as outside the screen center, said photometry regions being of a size equal to or smaller than a focusing visual observation part of that screen;

performing a second photometry of the object field using the luminous flux that does not pass through said screen;

selecting said photometry regions in at least the screen center and outside of the screen center; and selecting the output of said second photometry step in a case where the photometry region selected through said region selection step is in the screen center, and selecting the output of said first photometry step in other cases where the photometry region is outside of the screen center.

16. The method according to claim 15, wherein the step of performing a second photometry performs photometry using the output of a focus detection part.

17. A method of operating a camera photometry device equipped with an optical system capable of image formation of the luminous flux from an object field onto an interchangeable screen through the photographic lens, and capable of observation of the object field, and a plurality of photometry regions for photometry of the object field, the method comprising the steps of:

performing a first photometry of the image of the object field formed on said screen;

performing a second photometry of the object field by using luminous flux that does not pass through said screen;

selecting said photometry regions for photometry;

determining the type of said screen; and selecting the output of either said second photometry step or said first photometry step, based on the output of said screen type determination.

18. The method according to claim 17, wherein the step of performing a second photometry performs photometry using the output of a focus detection part.

19. The method according to claim 17, wherein the step of selecting an output further includes selecting the output of the second photometry step in a case when the region of a component part which is not a mat surface on the installed screen has been selected as the photometry region, and selecting the output of said first photometry step in all other cases.

20. The method according to claim 19, wherein the step of performing a second photometry performs photometry using the output of a focus detection part.

21. The method according to claim 17, wherein said output selecting step further includes selecting the output of said second photometry step in a case when a screen equipped with a focusing visual observation part is installed, and in which the region having the focusing visual observation part is selected as the photometry region, and selecting the output of said first photometry step in all other cases.

22. The method according to claim 21, wherein the step of performing a second photometry performs photometry using the output of a focus detection part.

23. The method according to claim 17, wherein the step of selecting the output includes the step of selecting the output of said second photometry step in a case in which the installed screen is completely transparent, and selecting the output of said first photometry step in all other cases.

24. The method according to claim 23, wherein the step of performing a second photometry performs photometry using the output of a focus detection part.

25. The method according to claim 17, wherein the step of selecting an output includes prohibiting the selection of photometry regions in cases in which the installed screen is completely transparent.

26. The method according to claim 25, wherein the step of performing a second photometry performs photometry using the output of a focus detection part.

* * * * *